(12) United States Patent
Otsuka et al.

(10) Patent No.: US 7,343,254 B2
(45) Date of Patent: Mar. 11, 2008

(54) RESOLVER DIGITAL CONVERTER

(75) Inventors: Tetsuro Otsuka, Gunma (JP); Atsushi Horikoshi, Kanagawa (JP); Nobuyasu Kanekawa, Hitachi (JP); Shoji Sasaki, Hitachinaka (JP)

(73) Assignees: NSK Ltd., Tokyo (JP); NSK Steering Systems Co., Ltd., Tokyo (JP)

( * ) Notice: Subject to any disclaimer, the term of this patent is extended or adjusted under 35 U.S.C. 154(b) by 282 days.

(21) Appl. No.: 11/110,697

(22) Filed: Apr. 21, 2005

(65) Prior Publication Data
US 2005/0252272 A1 Nov. 17, 2005

(30) Foreign Application Priority Data
Apr. 23, 2004 (JP) ............ P.2004-128302

(51) Int. Cl.
*G01R 31/00* (2006.01)
(52) U.S. Cl. .............. 702/58; 702/57; 702/59; 702/183; 702/189; 702/151; 702/150; 318/432
(58) Field of Classification Search ........ 318/432; 702/189, 183, 150, 151, 57, 58, 59
See application file for complete search history.

(56) References Cited

U.S. PATENT DOCUMENTS

| | | | | |
|---|---|---|---|---|
| 4,864,284 A | * | 9/1989 | Crayton et al. | 340/635 |
| 5,179,515 A | * | 1/1993 | Lunz et al. | 700/126 |
| 5,295,510 A | * | 3/1994 | Bolling et al. | 137/625.48 |
| 6,161,407 A | * | 12/2000 | Meisser | 72/21.4 |
| 6,205,009 B1 | * | 3/2001 | Clark et al. | 361/78 |
| 6,389,373 B1 | * | 5/2002 | Ohya | 702/189 |
| 6,472,841 B1 | * | 10/2002 | Piedl et al. | 318/661 |
| 6,556,937 B1 | * | 4/2003 | Byers | 702/116 |
| 6,577,957 B2 | * | 6/2003 | Fujimoto et al. | 702/36 |
| 6,925,401 B2 | * | 8/2005 | Kameya | 702/87 |

FOREIGN PATENT DOCUMENTS

| | | |
|---|---|---|
| JP | 9-280890 A | 10/1997 |
| JP | 2001-264114 A | 9/2001 |
| JP | 3216491 B2 | 10/2001 |

OTHER PUBLICATIONS

AU6802 Catalogue, Tamagawa Seiki Co., ltd.

* cited by examiner

*Primary Examiner*—Rita Leykin
(74) *Attorney, Agent, or Firm*—Sughrue Mion, PLLC

(57) ABSTRACT

In a resolver digital converter comprising a resolver, a resolver digital conversion part, and an excitation signal generation part, the resolver digital converter for inputting an excitation signal generated in the excitation signal generation part to the resolver and inputting resolver signals outputted from the resolver to the resolver digital conversion part, a locus in which amplitude of a sine component signal among the resolver signals $\sin(\theta)$, $\cos(\theta)$ outputted from the resolver is plotted as the ordinate axis and amplitude of a cosine component signal is plotted as the abscissa axis is approximated by a polygon and when the locus matches with sides of the approximated polygon, it is determined that the resolver is in a normal state and when the locus does not match, it is determined that the resolver is in a failure state.

6 Claims, 11 Drawing Sheets

FIG. 6

| SECTION | FAILURE OF DETECTION TARGET | DETECTION MEANS | |
|---|---|---|---|
| | | RESOLVER DIGITAL CONVERSION PART 2 | ERROR DETECTION FUNCTION 12 |
| RESOLVER DIGITAL CONVERSION PART 2 | (1) FAILURE ABOUT SIGNAL WAVEFORM ABNORMALITY IN WHICH SIGNAL FROM RESOLVER OR TO RESOLVER BREAKS | ○ | ○ |
| | (2) FAILURE OF FUNCTION OF DETECTING FAILURE (1) AND NOTIFYING MICROCOMPUTER | | ○ |
| | (3) FAILURE OF RESOLVER DIGITAL CONVERSION FUNCTION ITSELF WHICH IS PROCESS OF OBTAINING $\theta$ BASED ON SIGNAL FROM RESOLVER | ○ | ○ |
| | (4) FAILURE OF FUNCTION OF DETECTING FAILURE (3) AND NOTIFYING MICROCOMPUTER | | ○ |
| ERROR DETECTION FUNCTION 12 | (1) FAILURE ABOUT SIGNAL WAVEFORM ABNORMALITY IN WHICH SIGNAL FROM RESOLVER OR TO RESOLVER BREAKS | ○ | |
| | (2) FAILURE OF FUNCTION OF DETECTING FAILURE (1) AND NOTIFYING MICROCOMPUTER | ○ | |
| | (3) FAILURE OF RESOLVER DIGITAL CONVERSION FUNCTION ITSELF WHICH IS PROCESS OF OBTAINING $\theta$ BASED ON SIGNAL FROM RESOLVER | ○ | |
| | (4) FAILURE OF FUNCTION OF DETECTING FAILURE (3) AND NOTIFYING MICROCOMPUTER | ○ | |

RESOLVER DIGITAL CONVERTER

BACKGROUND OF THE INVENTION

1. Technical Field

The present invention relates to a resolver digital converter, and particularly to a resolver digital converter having a failure detection function.

2. Related Art

In a servo control system, a rotation angle sensor is required in order to detect a rotation angle and perform feedback control. Also, in control of a brushless motor, it is necessary to pass a current through a coil of the motor according to a rotation angle of the motor, so that the rotation angle sensor is required as well as the servo control system.

As this rotation angle sensor, in the related art, a resolver constructed of only a winding has been widely used because of environment resistance, toughness resulting from the simple configuration. This resolver is equivalent to a transformer in principle, and differs from the transformer structurally in that an iron core is divided into a rotor and a stator.

Also, in a servo control system applied to motor-driven power steering, x-by-wire, particularly, steer-by-wire, fly-by-wire, etc., a failure detection function is required in order to require safety and reliability.

Also, a resolver digital converter for making conversion into a rotation angle based on a signal from a resolver and doing input to a microcomputer etc. as digital data has been developed in recent years (for example, see Smartcoder, AU6802 Catalogue, Tamagawa Seiki Co., Ltd., T12-1591N2 (Apr. 20, 2002), which is hereinafter referred as Non-patent Reference 1). In the resolver digital converter according to this Non-patent Reference 1, a feedback loop for making a correction to an estimation value $\phi$ of a rotation angle by a residual $\epsilon$ of a result of performing calculation of an input signal and $\sin(\phi)$, $\cos(\phi)$ generated by the estimation value $\phi$ of the rotation angle is formed and the estimation value $\phi$ of the rotation angle is converged on an actual rotation angle $\theta$. The present method further has a function of notifying the microcomputer that a failure occurs when the residual $\epsilon$ exceeds a certain value.

Also, a failure is detected by using characteristics of a trigonometric function of $\sin^2\theta+\cos^2\theta=1$ which is an output of a resolver (for example, see JP-A-9-280890 (Page 4, FIG. 1) which is hereinafter referred as Patent Reference 1).

According to Non-patent Reference 1, when a signal outputted from the resolver or a signal inputted to the resolver is blocked, the signal outputted from the resolver becomes abnormal and a relation between $\sin(\theta)$ and $\cos(\theta)$ used as a premise of convergence of a feedback loop does not hold. As a result of this, the residual $\epsilon$ does not converge and the residual $\epsilon$ becomes large and notification of a failure is provided from the resolver digital converter to the microcomputer. Also, when a feedback loop for obtaining an estimation value $\phi$ of a rotation angle including a resolver digital conversion part does not function correctly, the residual E does not converge similarly and the residual $\epsilon$ becomes large and error detection signal is provided from the resolver digital converter to the microcomputer.

However, according to Non-patent Reference 1, when a failure (open, short failure, permanent failure of output) of a function of notifying the microcomputer of occurrence of a failure and a function of determining that the residual $\epsilon$ exceeds a certain value occurs, there is a problem that the microcomputer cannot be notified of the occurrence of the failure.

Further, there is a failure mode in which a portion of a winding shorts out (a layer short) in the resolver, and according to Non-patent Reference 1, a failure is not detected in a state of specializing in the layer short and, so that there is a problem that there is a limit to accuracy of layer short failure detection.

Also, according to Patent Reference 1, when a signal outputted from the resolver or a signal inputted to the resolver is blocked, the signal outputted from the resolver becomes abnormal and a relation between $\sin(\theta)$ and $\cos(\theta)$ does not hold. As a result of this, a value of $\sin^2\theta+\cos^2\theta$ deviates from 1, so that it is detected as a failure and a microcomputer can be notified. Also, in this Patent Reference 1, a failure is detected in a state of specializing in the relation between $\sin(\theta)$ and $\cos(\theta)$, so that unbalance of a level of $\sin(\theta)$ and $\cos(\theta)$ because of a layer short which is a failure mode in which a portion of a winding shorts out can be detected exactly. However, in the case of calculating $\sin^2(\theta)+\cos^2(\theta)$, computation of square of a variable is required and this computation leads to a processing load of the microcomputer and particularly in the case of using a processor of the limit of capability from an economical standpoint, there is a problem that processing cannot be performed.

Further, according to Patent Reference 1, a detectable failure is only a failure about signal waveform abnormality in which a signal from or to the resolver is blocked, and there is a problem that a failure of the resolver digital conversion function itself which is a process of obtaining $\theta$ cannot be detected.

Also, a failure capable of providing notification to the microcomputer is:

(1) a failure about signal waveform abnormality in which a signal outputted from the resolver or a signal inputted to the resolver is blocked, etc., (2) a failure of a function of detecting the failure of (1) and notifying the microcomputer, (3) a failure of the resolver digital conversion function itself which is a process of obtaining $\theta$ based on a signal outputted from the resolver, and, (4) a failure of a function of detecting the failure of (3) and notifying the microcomputer.

Even in the case of combining Non-patent Reference 1 with Patent Reference 1, these failures are not detected.

SUMMARY OF THE INVENTION

An object of the invention is to provide a resolver digital converter capable of detecting a failure about signal waveform abnormality in which a signal outputted from a resolver or a signal inputted to the resolver is blocked, etc.

Another object of the invention is to provide a resolver digital converter in which a processing load of a microcomputer is not increased.

However, the present invention need not achieve the above objects, and other objects not described herein may also be achieved. Further, the invention may achieve no disclosed objects without affecting the scope of the invention.

The invention is a resolver digital converter comprising a resolver, a resolver digital conversion part, and an excitation signal generation part, the resolver digital converter for inputting an excitation signal generated in the excitation signal generation part to the resolver and inputting resolver signals outputted from the resolver to the resolver digital conversion part, and is characterized in that a locus in which amplitude of a sine component signal among the resolver signals outputted from the resolver is plotted as the ordinate axis and amplitude of a cosine component signal is plotted as the abscissa axis is approximated by a polygon and when the locus matches with sides of the approximated polygon, it is determined that the resolver is in a normal state and when the locus does not match, it is determined that the resolver is in a failure state.

According to the invention, a failure about signal waveform abnormality in which a signal from a resolver or to the resolver is blocked can be detected.

Also, according to the invention, a failure of a function of notifying a microcomputer of the failure about signal waveform abnormality can be detected.

Also, according to the invention, a failure of the resolver digital conversion function itself which is a process of obtaining θ based on a signal from the resolver can be detected.

Further, according to the invention, a failure of a function of detecting the failure of the resolver digital conversion function itself and notifying the microcomputer can be detected.

BRIEF DESCRIPTION OF THE DRAWINGS

FIG. 6 is a diagram showing failures capable of being detected by the present example.

DETAILED DESCRIPTION OF THE INVENTION

A resolver digital converter according to the invention comprises means for capturing a signal outputted from a resolver into a microcomputer in synchronization with an excitation signal inputted to the resolver, and processing data captured into the microcomputer, so that detection of a failure about signal waveform abnormality such as blockage of a signal outputted from the resolver or blockage of a signal inputted to the resolver is implemented.

Further, in a resolver digital converter according to the invention, in order to check the reliability of a signal which is outputted from a resolver and is inputted to a microcomputer, a locus in which amplitude of a sine component signal among resolver signals outputted from the resolver is plotted as the ordinate axis and amplitude of a cosine component signal is plotted as the abscissa axis is approximated by a regular polygon and the fact that the locus does not deviate from the approximated regular polygon is monitored and thereby, determination of abnormality of the resolver is implemented.

EXAMPLE 1

Examples of the Invention Will be Described Below in Detail.

Figure 1:
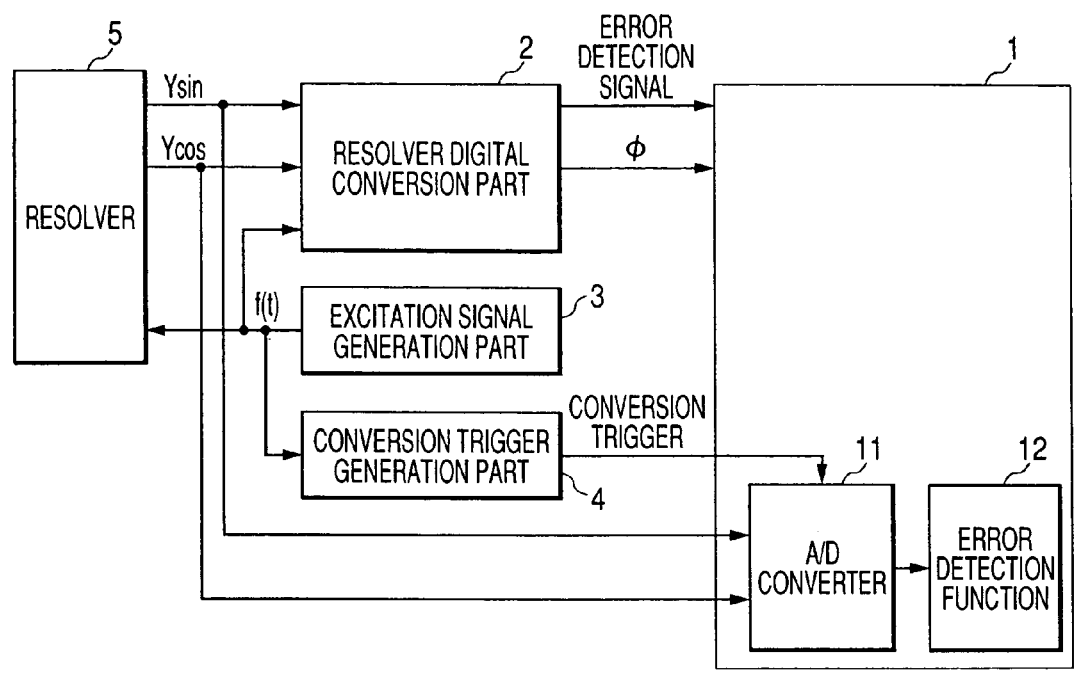
FIG. 1 is a diagram showing a basic example of a resolver digital converter according to the invention.

A basic example of a resolver digital converter according to the invention is shown in FIG. 1.

In FIG. 1, the resolver digital converter comprises a microcomputer 1, a resolver digital conversion part 2, an excitation signal generation part 3, a conversion trigger generation part 4, a resolver 5, an A/D converter 11, and an error detection function 12.

An excitation signal f(t) generated in the excitation signal generation part 3 is inputted to the resolver 5. In this excitation signal f(t), generally, a trigonometric function such as A·sin(ωt) is often used. However, when it is assumed that A is amplitude and ω is angular velocity and a frequency is f, it is expressed by ω=2πf.

Also, resolver signals Y sin, Y cos are outputted from the resolver 5. When it is assumed that a rotation angle of the resolver 5 is θ, the resolver signals Y sin, Y cos are respectively expressed by the following formula.

$$Y\sin = k \cdot \sin(\theta) \cdot f(t)$$

$$Y\cos = k \cdot \cos(\theta) \cdot f(t)$$

where k is gain.

Also, in the resolver digital conversion part 2, based on the resolver signals Y sin, Y cos, an estimation value φ of an angle is computed and the estimation value φ of the angle is outputted from this resolver digital conversion part 2 to the microcomputer 1. Also, together with the estimation value φ of the angle, an error detection signal is inputted from the resolver digital conversion part 2 to the microcomputer 1.

Incidentally, the resolver digital conversion part 2 contemplates various examples, and typically includes a method by Non-patent Reference 1. In the method by this Non-patent Reference 1, the resolver digital conversion part 2 and the excitation signal generation part 3 are built into the same chip.

The configuration described above is the same configuration as the related-art resolver digital conversion part, but the resolver digital converter according to the invention further comprises the conversion trigger generation part 4, the A/D converter 11 disposed in the microcomputer 1, and the error detection function 12 disposed in the microcomputer 1.

In the conversion trigger generation part 4, an excitation signal f(t) outputted from the excitation signal generation part 3 to the resolver 5 is inputted and a conversion trigger signal is generated by this excitation signal f(t). The conversion trigger signal generated in this conversion trigger generation part 4 is outputted to the A/D converter 11 disposed in the microcomputer 1. By an input of this conversion trigger signal, the A/D converter 11 converts resolver signals Y sin, Y cos outputted from the resolver 5 into a digital signal and outputs the signal to the error detection function 12. In this error detection function 12, an error because of a failure is detected based on a digital value of the resolver signals Y sin, Y cos outputted from this A/D converter 11.

EXAMPLE 2

Figure 2:
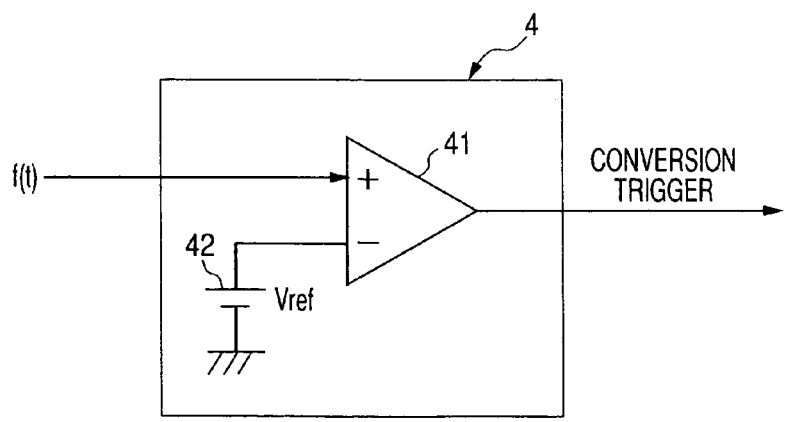
FIG. 2 is a diagram showing an example of a conversion trigger generation part illustrated in FIG. 1.

A specific example of the conversion trigger generation part 4 illustrated in FIG. 1 is shown in FIG. 2.

FIG. 2 is an example of the conversion trigger generation part 4 for comparing an excitation signal f(t) outputted from the excitation signal generation part 3 with a reference voltage (Vref) 42 in a voltage comparator 41 and generating a conversion trigger signal.

According to the present example, by the excitation signal f(t) outputted from the excitation signal generation part 3, A/D conversion of resolver signals Y sin, Y cos is made in the A/D converter 11, so that when it is assumed that f(t)=Vref, the resolver signals Y sin, Y cos at a point in time of the A/D conversion are respectively expressed by the following formula.

$Y\sin = k\cdot\sin(\theta)\cdot Vref$ $Y\cos = k\cdot\cos(\theta)\cdot Vref$

Therefore, $\sin(\theta)$ and $\cos(\theta)$ are obtained by the following formula.

$\sin(\theta) = Y\sin/[SQRT\ (Y\sin^2 + Y\cos^2)]$ $\cos(\theta) = Y\cos/[SQRT\ (Y\sin^2 + Y\cos^2)]$ It can be determined that it is in a normal state when a difference between $\sin(\phi)$, $\cos(\phi)$ based on an estimation value $\phi$ of an angle and $\sin(\theta)$, $\cos(\theta)$ obtained in this manner is within a tolerance, and can be determined that it is in a failure state when the difference is beyond the tolerance.

Incidentally, SQRT $(Y\sin^2 + Y\cos^2)$, that is, a value of k·Vref can be calculated from a circuit constant, characteristics of the resolver at a stage of design, so that computation is facilitated by using a constant calculated previously. Also, even in the case of considering an instrumental error, by making setting as a constant at the time of shipment, computation is facilitated and also deterioration with time can be detected.

Further, $\tan(\theta)$ is obtained from a formula of $\tan(\theta) = \sin(\theta)/\cos(\theta)$, and it can be determined that it is in a normal state when a difference between $\tan(\theta)$ and $\tan(\phi)$ based on an estimation value $\phi$ of an angle is within a tolerance, and can be determined that it is in a failure state when the difference is beyond the tolerance.

EXAMPLE 3

Figure 3:
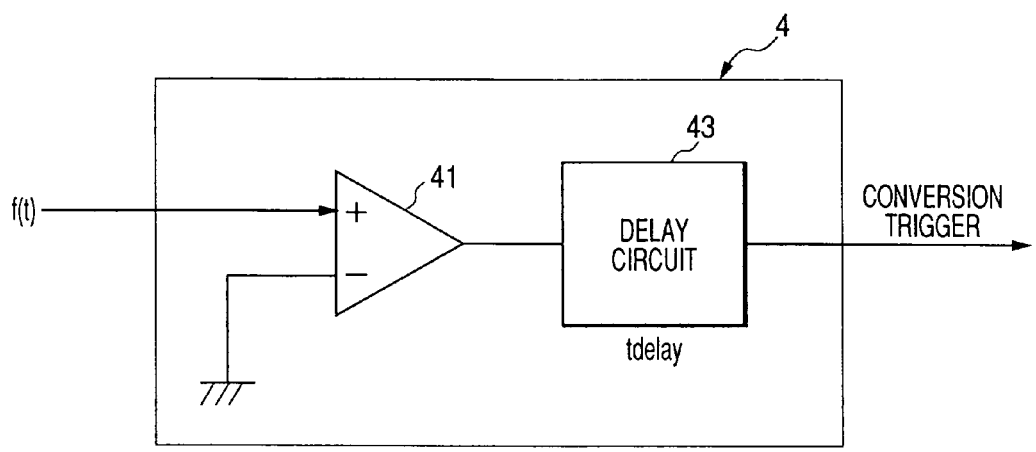
FIG. 3 is a diagram showing another example of the conversion trigger generation part illustrated in FIG. 1.

Another specific example of the conversion trigger generation part 4 illustrated in FIG. 1 is shown in FIG. 3.

FIG. 3 is an example of the conversion trigger generation part 4 for comparing an excitation signal f(t) outputted from the excitation signal generation part 3 with 0 V in a voltage comparator 41 and detecting a zero cross point and giving a tdelay delay in a delay circuit 43.

According to the present example, when it is assumed that the excitation signal f(t) outputted from the excitation signal generation part 3 is $f(t) = A\cdot\sin(\omega tdelay)$, resolver signals Y sin, Y cos at a point in time of A/D conversion are respectively expressed by the following formula.

$Y\sin = k\cdot\sin(\theta)\cdot A\cdot\sin(\omega tdelay)$ $Y\cos = k\cdot\cos(\theta)\cdot A\cdot\sin(\omega tdelay)$ And $\sin(\theta)$, $\cos(\theta)$, $\tan(\theta)$ can be obtained in a manner similar to the example illustrated in FIG. 2. It can be determined that it is in a normal state when a difference between $\sin(\phi)$, $\cos(\phi)$), $\tan(\phi)$ based on an estimation value $\phi$ of an angle and the values of $\sin(\theta)$, $\cos(\theta)$, $\tan(\theta)$ obtained is within a tolerance, and can be determined that it is in a failure state when the difference is beyond the tolerance.

Incidentally, $\omega tdelay = \lambda/2$, that is, $tdelay = \lambda/2\omega$ is preferable from the viewpoint of improving a signal-to-noise (S/N) ratio by maximizing the resolver signals Y sin, Y cos.

Incidentally, in the present example, the delay circuit 43 for giving a tdelay delay can also be implemented by a timer inside a microprocessor and external parts can be reduced significantly by being built into the microprocessor thus.

EXAMPLE 4

Figure 4:
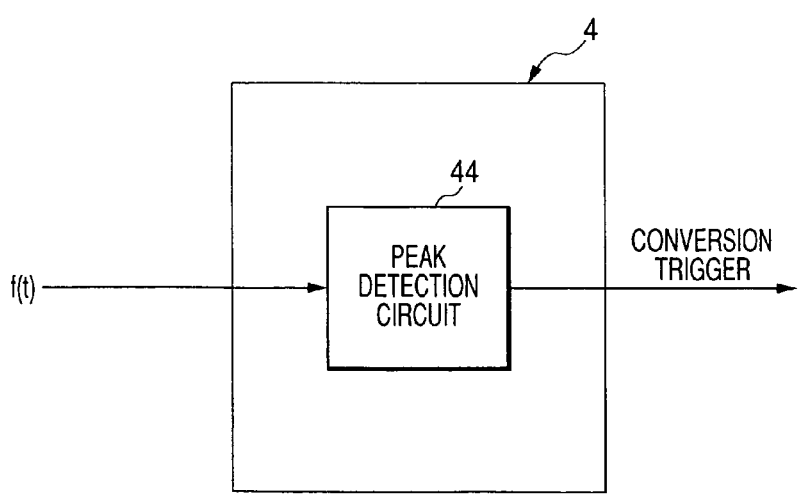
FIG. 4 is a diagram showing another example of the conversion trigger generation part illustrated in FIG. 1.

A further specific example of the conversion trigger generation part 4 illustrated in FIG. 1 is shown in FIG. 4.

FIG. 4 is an example in which the conversion trigger generation part 4 is constructed of a peak detection circuit 44. Implementation means of this peak detection circuit 44 includes a method for differentiating an excitation signal f(t) and obtaining the time reaching zero, a method for delaying a phase of an excitation signal f(t) by 90° by a phase shifting circuit and obtaining a zero cross, a method in which the peak is held while updating the peak sequentially and the time at which the present value reaches the peak hold value or less is set at the peak time, etc.

According to the present example, resolver signals Y sin, Y cos at a point in time of A/D conversion are respectively expressed by the following formula.

$Y\sin = k\cdot\sin(\theta)\cdot A$ $Y\cos = k\cdot\cos(\theta)\cdot A$

And $\sin(\theta)$, $\cos(\theta)$, $\tan(\theta)$ can be obtained in a manner similar to the example illustrated in FIG. 2 and the example illustrated in FIG. 3. It is determined that it is in a normal state when a difference between $\sin(\phi)$, $\cos(\phi)$, $\tan(\phi)$ based on an estimation value $\phi$ of an angle and the values of $\sin(\theta)$, $\cos(\theta)$, $\tan(\theta)$ obtained is within a tolerance, and is determined that it is in a failure state when the difference is beyond the tolerance.

Figure 5:
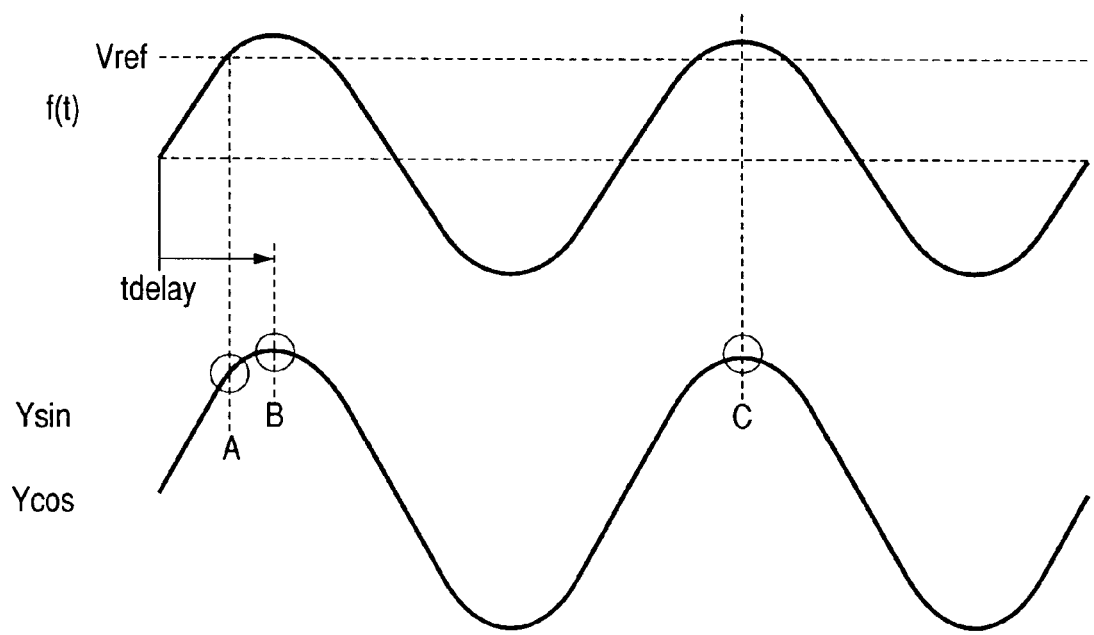
FIG. 5 is a diagram showing conversion timing of resolver signals Y sin, Y cos based on each of the examples of FIGS. 2 to 4.

Conversion timing of the resolver signals Y sin, Y cos based on each of the examples of FIGS. 2 to 4 is shown in FIG. 5.

In FIG. 5, the abscissa axis is time and the ordinate axis is amplitude of resolver signals Y sin, Y cos and an excitation signal f(t). According to the example illustrated in FIG. 2, the resolver signals Y sin, Y cos are converted at the time when the excitation signal f(t) has reached Vref, that is, at a point A. According to the example illustrated in FIG. 3, the resolver signals are converted at the time when tdelay has elapsed since a zero cross point of the excitation signal f(t), that is, at a B point. In the case of tdelay=λ/(4ω) in this example illustrated in FIG. 3, conversion is made at the peak of the signal, so that it becomes optimum from the viewpoint of improving the S/N ratio. According to the example illustrated in FIG. 4, Y sin, Y cos are converted at the time C when the excitation signal f(t) has reached the peak.

According to each of the examples illustrated in FIGS. 1 to 4, as shown in FIG. 6, a failure about signal waveform abnormality in which a signal from the resolver 5 or to the resolver 5 is blocked can be detected by the error detection function 12 of the present example in addition to a failure detection function disposed in the resolver digital conversion part 2. Also, a function of detecting the failure about signal waveform abnormality in which the signal from the resolver 5 or to the resolver 5 is blocked and notifying the microcomputer 1 is redundantly disposed in the resolver digital conversion part 2 and the error detection function 12, so that even when one of the resolver digital conversion part 2 and the error detection function 12 fails, a failure of the function of detecting the failure about signal waveform abnormality in which the signal from the resolver 5 or to the resolver 5 is blocked and notifying the microcomputer 1 can also be detected by the other function.

Also, a failure of the resolver digital conversion function itself which is a process of obtaining θ based on resolver signals Y sin, Y cos outputted from the resolver 5 can be detected by the error detection function 12 of the present example in addition to the failure detection function disposed in the resolver digital conversion part 2. Also, a function of detecting the failure of the resolver digital conversion function itself which is the process of obtaining 0 based on the resolver signals Y sin, Y cos outputted from the resolver 5 and notifying the microcomputer 1 is redundantly disposed in the resolver digital conversion part 2 and the error detection function 12, so that even when one of the resolver digital conversion part 2 and the error detection function 12 fails, a failure of the function of detecting the failure of the resolver digital conversion function itself which is the process of obtaining θ based on the resolver signals Y sin, Y cos outputted from the resolver 5 and notifying the microcomputer can also be detected by the other function.

According to the examples described above, the failure of the resolver 5 and the resolver digital conversion part 2 can be detected and when a failure is detected in use of motor-driven power steering etc., a fail-safe action can be ensured by taking measures to stop a motor-driven assist. Also, in x-by-wire, particularly, steer-by-wire, fly-by-wire, an action stop of a system is not permitted, so that fault tolerance in which an operation can be continued even when a failure occurs is required.

Figure 7:
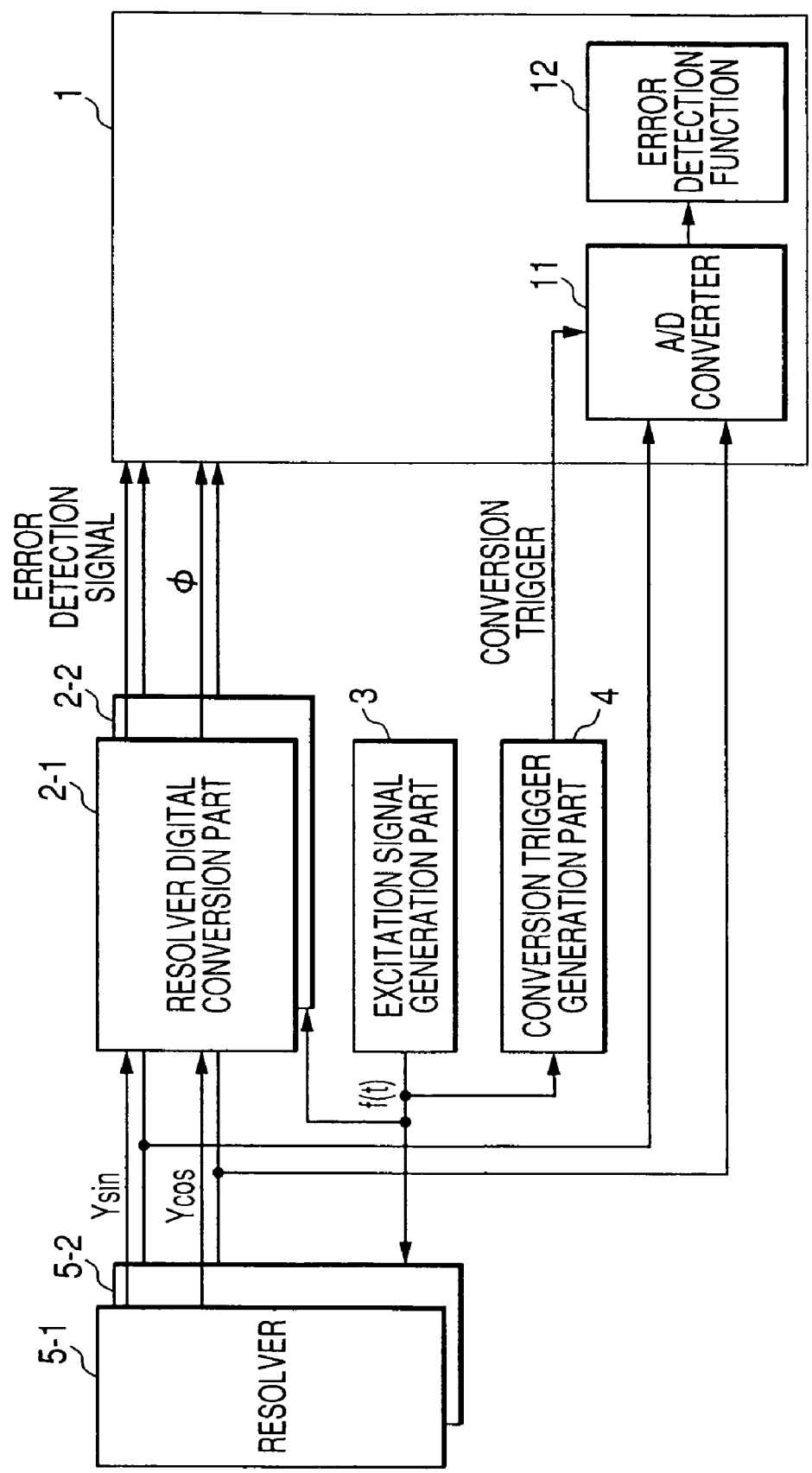
FIG. 7 is a diagram showing an example of a fault-tolerant resolver and resolver digital conversion part in which the resolver and resolver digital conversion part illustrated in FIG. 1 are duplicated.

Hence, as illustrated in FIG. 7, resolvers 5-1, 5-2 and resolver digital conversion parts 2-1, 2-2 are duplicated and are combined with an error detection function 12 thereby resulting in a substantially triplex system and fault tolerance can be achieved. When a failure occurs in one of the resolvers 5-1, 5-2 and the resolver digital conversion parts 2-1, 2-2 duplicated thus, the failure can be detected by the error detection function 12 in addition to a failure detection function disposed in the resolver digital conversion parts 2-1, 2-2 and a failure section can be identified. Subsequently, an action can be continued using the side, in which the failure does not occur, of the resolvers 5-1, 5-2 and the resolver digital conversion parts 2-1, 2-2 duplicated. Also, multiplexing of the microcomputer 1 is more desirable.

EXAMPLE 5

Figure 8:
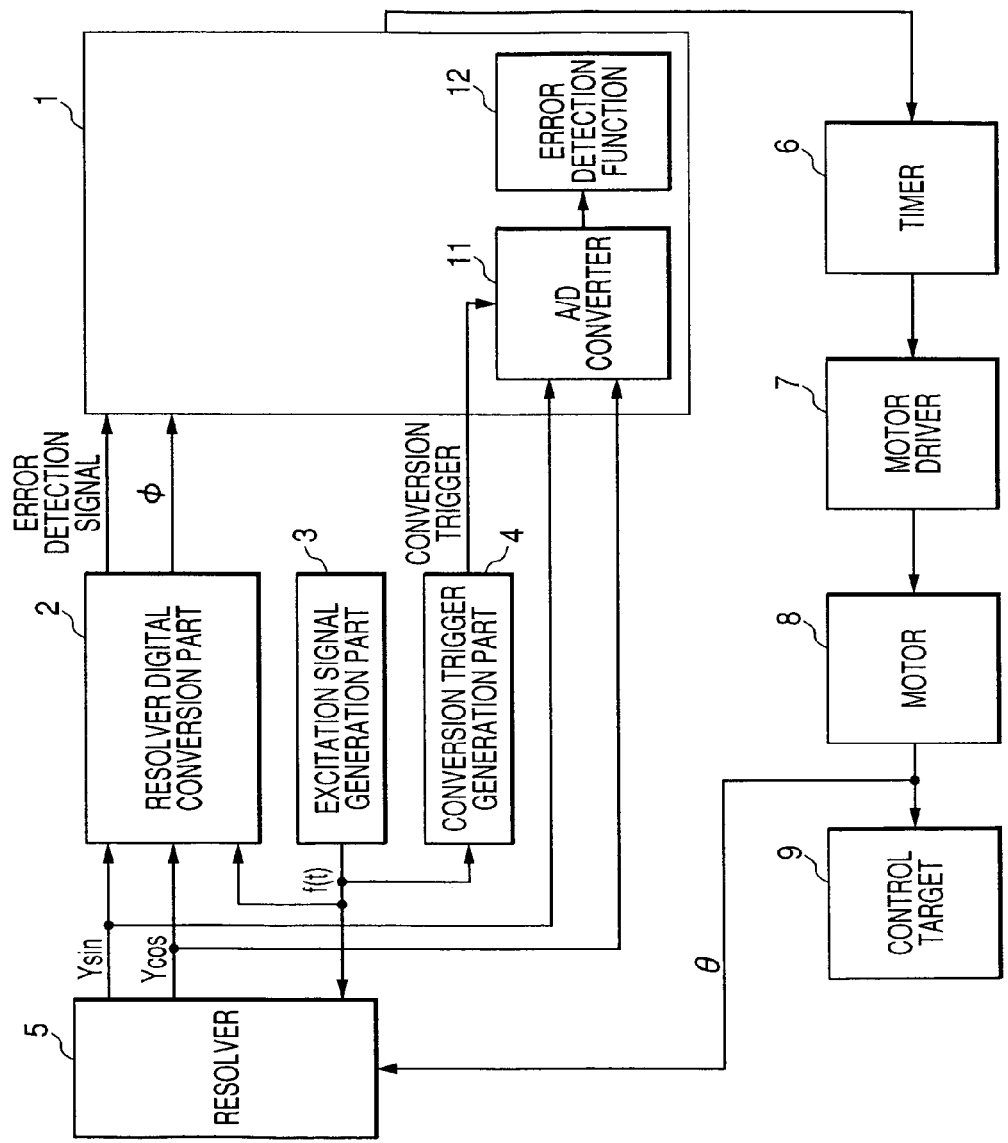
FIG. 8 is a diagram showing an example in which a resolver digital converter according to the invention is applied to a motor control system.

FIG. 8 is an example in which a resolver digital converter according to the invention is applied to a motor control system.

In FIG. 8, based on an estimation value φ of an angle from a resolver digital conversion part 2, a microcomputer 1 outputs a driving command to a motor to a timer 6 for generating a PWM signal. In the timer 6, a PWM signal of a predetermined duty cycle is generated based on a command from the microcomputer 1 and a motor 8 is driven by a motor driver 7 according to a waveform of the signal. An output shaft of the motor 8 is connected to a control target 9 and the control target 9 is moved and also a rotation angle connected to the resolver 5 is measured and is inputted to the microcomputer 1.

Incidentally, in a motor-driven power steering control device, the control target 9 is the whole steering system. Also, in a steer-by-wire control device, the control target 9 is a steering column and a steering mechanism (steering mechanism).

EXAMPLE 6

Figure 9:
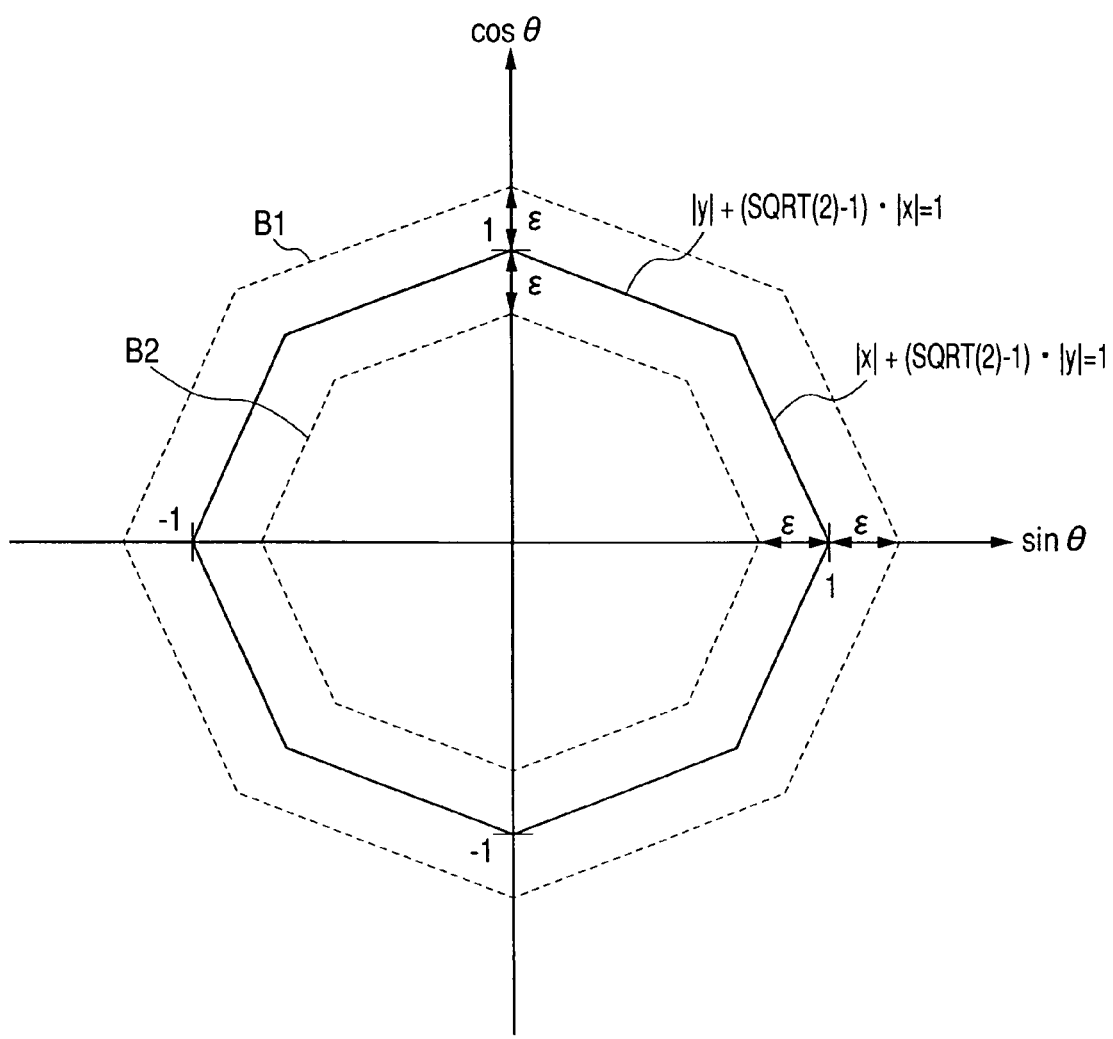
FIG. 9 is a diagram showing an example of an error detection function illustrated in FIG. 1.

An example of an error detection function 12 for detecting abnormality of a resolver 5 and a resolver digital conversion part 2 from resolver signals Y sin, Y cos outputted from the resolver 5 is shown in FIG. 9.

In the related art, the fact that a locus in which resolver signals sin(θ) and cos(θ) outputted from the resolver 5 are respectively plotted as the abscissa axis and the ordinate axis does not deviate from a unit circle was monitored. On the other hand, a method in which the related-art locus formed by the unit circle is approximated by a polygon and the fact that a locus in which amplitude of a sine component signal among resolver signals Y sin, Y cos outputted from the resolver 5 is plotted as the ordinate axis and amplitude of a cosine component signal is plotted as the abscissa axis does not deviate from the polygon is monitored is adopted in the example illustrated in FIG. 9. That is, a locus in which amplitude of a sine component signal among resolver signals Y sin, Y cos outputted from the resolver 5 is plotted as the ordinate axis and amplitude of a cosine component signal is plotted as the abscissa axis is approximated by a polygon and when this locus matches with a side of the approximated polygon, it is determined that the resolver is in a normal state and when the locus does not match, it is determined that the resolver is in a failure state.

For example, when the locus in which amplitude of a sine component signal among the resolver signals Y sin, Y cos outputted from the resolver 5 is plotted as the ordinate axis and amplitude of a cosine component signal is plotted as the abscissa axis is approximated by a regular octagon as illustrated in FIG. 9, it focuses on symmetry with respect to the x axis and the y axis. Then, for $|y|>SQRT(2)/2$, $|y|+(SQRT(2)-1)\cdot|x|=1$, and for $|y|<SQRT(2)/2$, $|x|+(SQRT(2)-1)\cdot|y|=1$, and where $x=\sin(\theta)$ and $y=\cos(\theta)$.

Incidentally, here, (SQRT (2)−1) could be obtained previously as a constant, so that evaluation can be made by simple computation of an absolute value, addition and multiplication of the constant.

When the locus in which amplitude of a sine component signal among the resolver signals Y sin, Y cos outputted from this resolver 5 is plotted as the ordinate axis and amplitude of a cosine component signal is plotted as the abscissa axis is approximated by a regular n-sided polygon (n is multiples of 4) without being limited to the regular octagon as illustrated in FIG. 9, each quadrant is congruent in the case of using symmetry with respect to the x axis and the y axis, so that it is best since a region determination becomes unnecessary and computation for determination can be performed by only obtaining absolute values of x, y.

Figure 10:
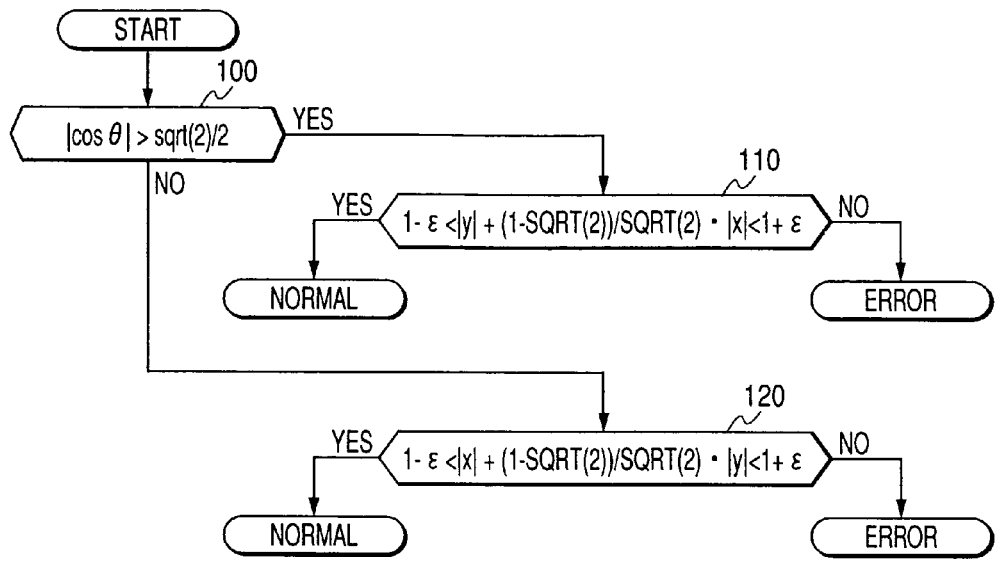
FIG. 10 is a diagram showing a flowchart at the time when a determination range for determination of normality/abnormality of a resolver is set at ε.

Also, in the case that a determination range for determination of normality/abnormality of the resolver is set at $\epsilon$ and the resolver is in a normal state when a locus is present within a region surrounded by a boundary B1 and a boundary B2 and the resolver is in a failure state when the locus is present beyond the region, as shown by a flowchart illustrated in FIG. 10, a failure of the resolver can be detected by condition decisions that for $|y|>\text{SQRT}(2)/2$, it is in the normal state in the case of $1-\epsilon<|y|+(\text{SQRT}(2)-1)\cdot|x|<1+\epsilon$ and it is in the failure state otherwise, and for $|y|<\text{SQRT}(2)/2$, it is in the normal state in the case of $1-\epsilon<|x|+(\text{SQRT}(2)-1)\cdot|y|<1+\epsilon$ and it is in the failure state otherwise.

Based on the example described above, effective detection of a layer short failure can be implemented by simple computation.

Figure 11:
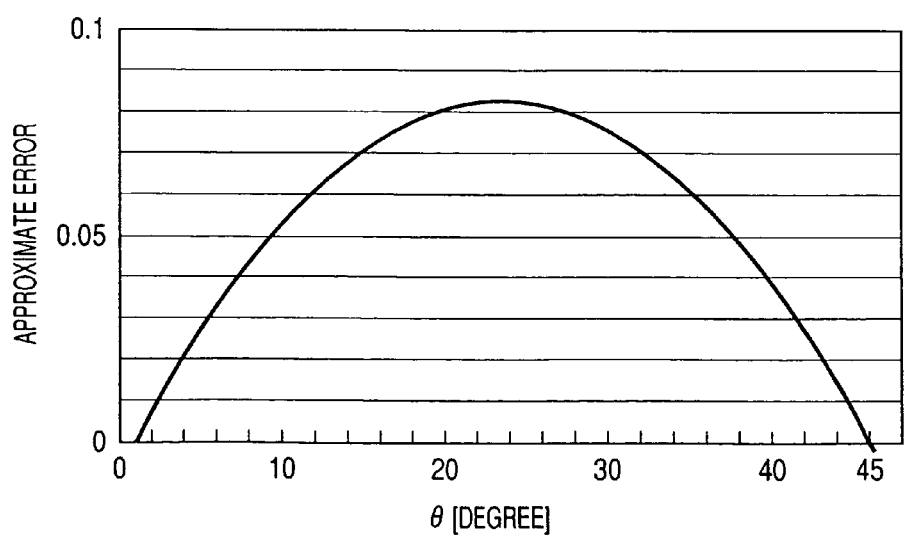
FIG. 11 is a diagram showing an error of the case that a locus in which a resolver signal outputted from a resolver is plotted is approximated by a regular octagon.

An error of a value of $|y|+(\text{SQRT}(2)-1)\cdot|x|$ by approximation in the case that the locus in which amplitude of a sine component signal among the resolver signals Y sin, Y cos outputted from the resolver 5 is plotted as the ordinate axis and amplitude of a cosine component signal is plotted as the abscissa axis is approximated by the regular octagon as illustrated in FIG. 9 is shown in FIG. 11. As is evident from this FIG. 11, an error by approximating to the regular polygon becomes in the range of 0 to 0.082. Therefore, when $\epsilon$ is sufficiently larger than 0.082 (for example, $\epsilon=0.2$), it results in sufficient approximation.

Figure 12:
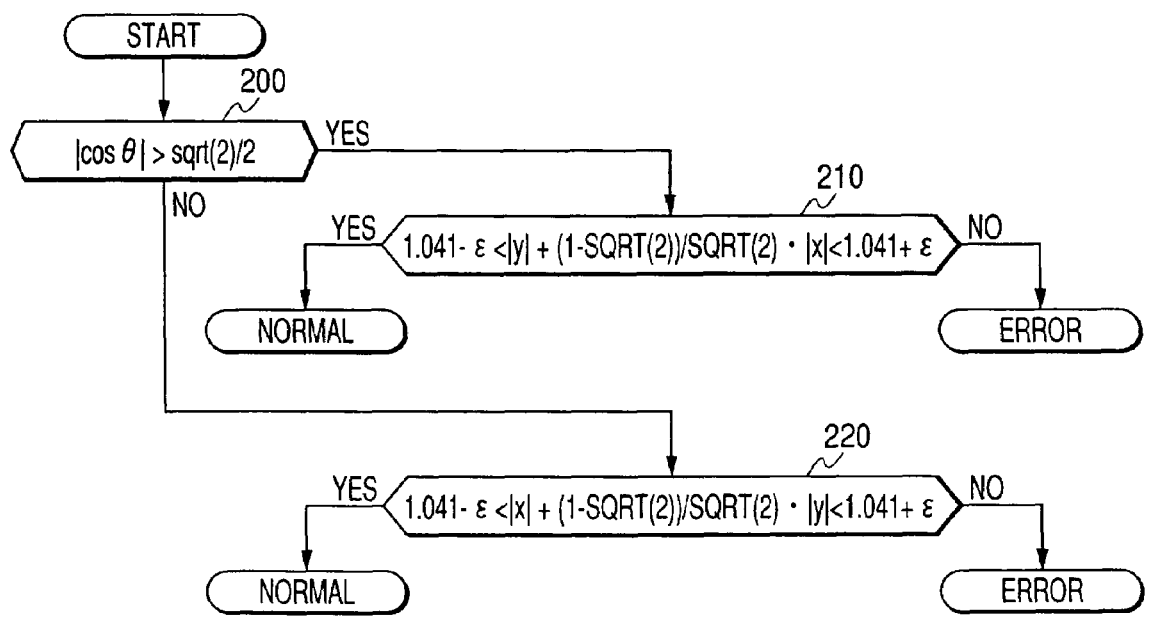
FIG. 12 is a diagram showing a flowchart at the time of making correction in order to improve approximate precision.

Furthermore, in order to improve approximate precision, correction is made by 0.041 and as shown by a flowchart illustrated in FIG. 12, when a failure is detected by decisions that for $|y|>\text{SQRT}(2)/2$, it is in a normal state in the case of $1.041-\epsilon<|y|+(\text{SQRT}(2)-1)\cdot|x|<1.041+\epsilon$ and it is in a failure state otherwise, and for $|y|<\text{SQRT}(2)/2$, it is in the normal state in the case of $1.041-\epsilon<|x|+(\text{SQRT}(2)-1)\cdot|y|<1.041+\epsilon$ and it is in the failure state otherwise, an error by approximation becomes ±0.041 and when $\epsilon$ is sufficiently larger than 0.041 (for example, $\epsilon=0.1$), it results in sufficient approximation.

EXAMPLE 7

Figure 13:
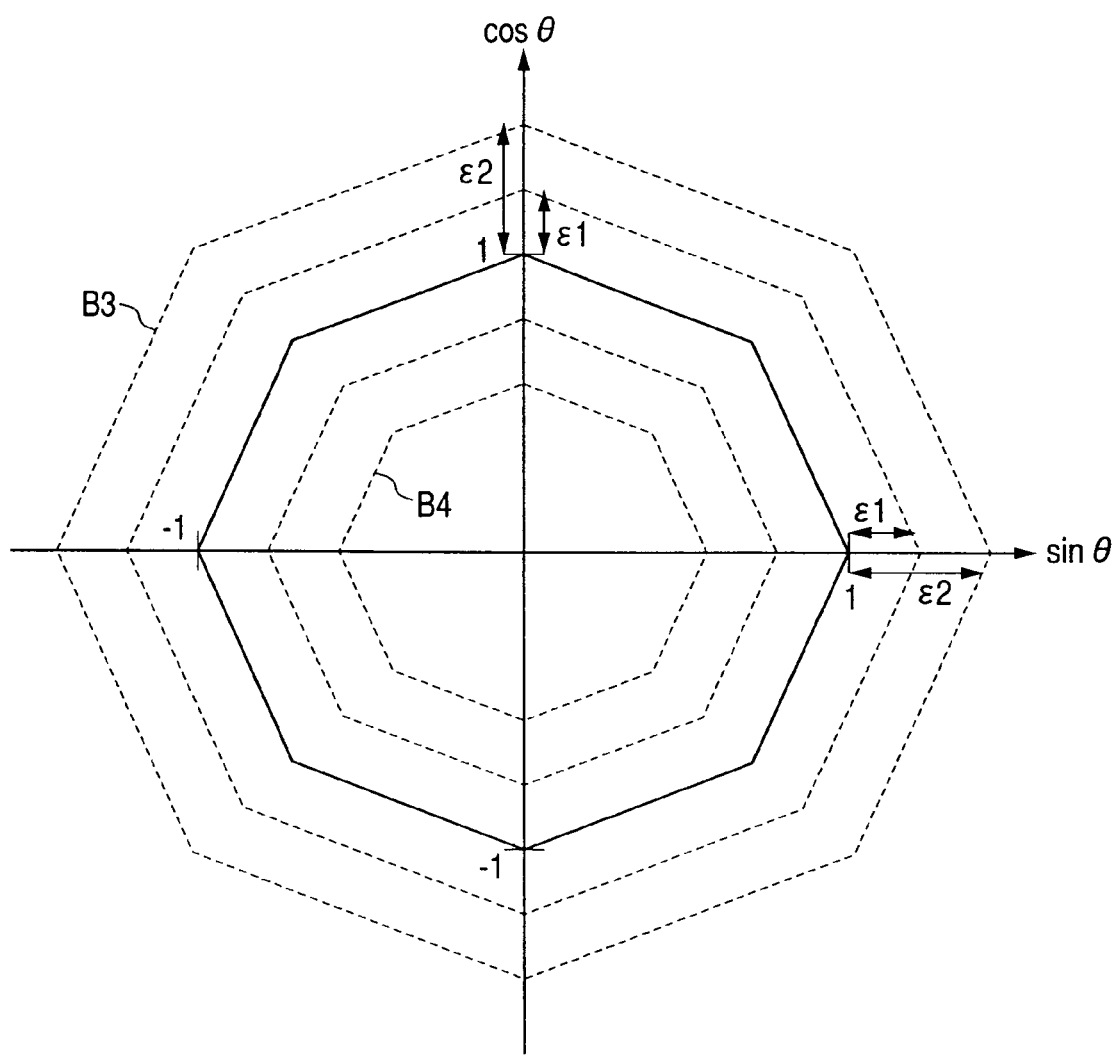
FIG. 13 is a diagram showing an example in which boundaries for failure determination are set at multiple stages.

An example in which boundaries for failure determination are set at multiple stages is shown in FIG. 13. In this example illustrated in FIG. 13, in a manner similar to the example illustrated in FIG. 9, (a) it is determined that it is in a normal state when a locus is present within a region surrounded by a boundary B1 and a boundary B2, and in addition, (b) it is determined that it is in a normal state when the locus is present within a region surrounded by a boundary B3 and a boundary B4 and beyond the region surrounded by the boundary B1 and the boundary B2 within a predetermined time t1, and it is determined that it is in a failure state when exceeding the time t1, and further, (c) it is determined that it is in a failure state when the locus is present beyond the region surrounded by the boundary B3 and the boundary B4.

As shown in the present example thus, it is not determined that it is in a failure state immediately even when the locus temporarily deviates from the region surrounded by the boundary B1 and the boundary B2 because of influence etc. of noise, and robustness of a failure detection function against noise can be provided.

Figure 14:
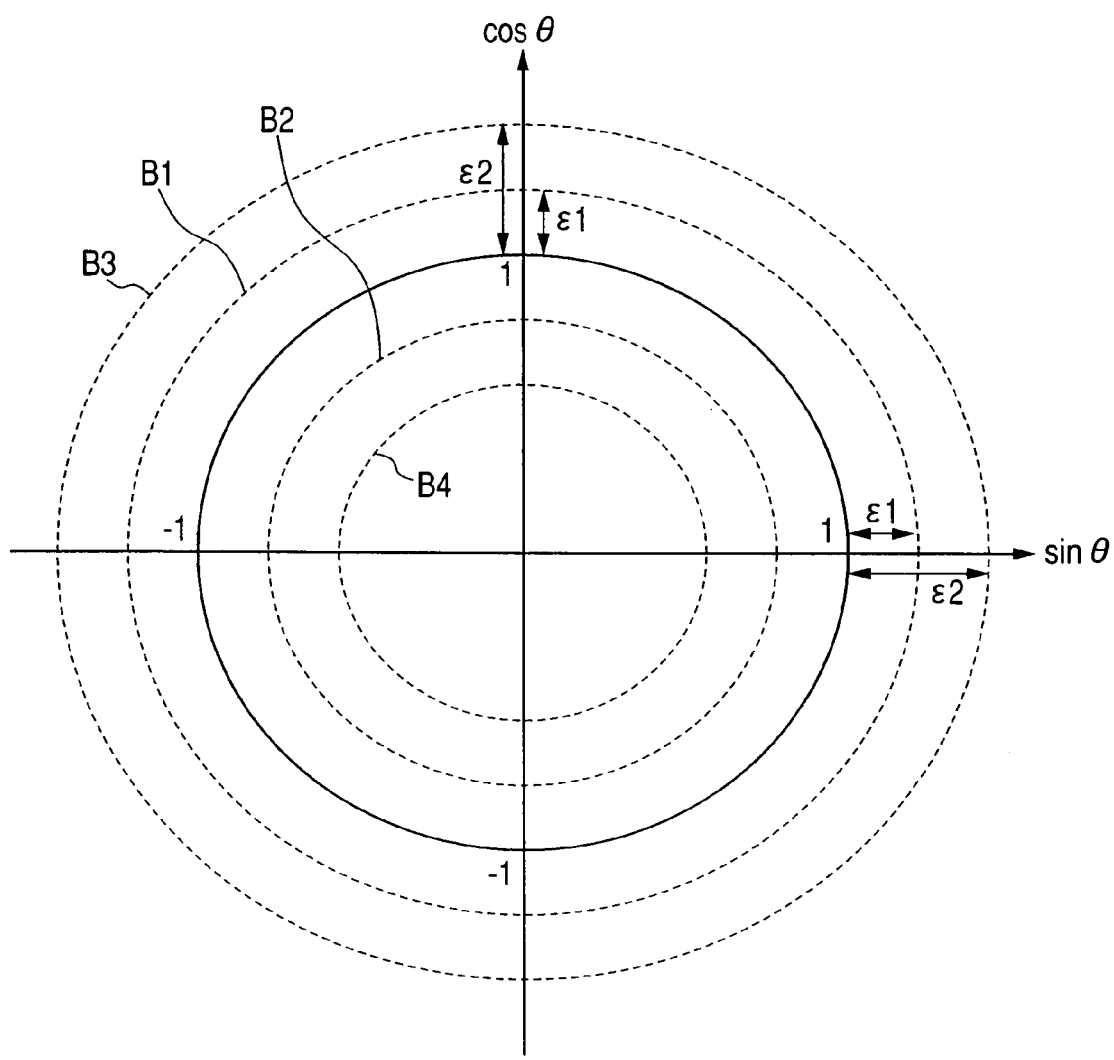
FIG. 14 is a diagram showing an example in which boundaries for failure determination are set at multiple stages at the time when a locus in which resolver signals sin(θ) and cos(θ) outputted from a resolver are respectively plotted as the abscissa axis and the ordinate axis is set at a unit circle.

This example illustrated in FIG. 13 can also be applied to the related art as illustrated in FIG. 14. That is, (a) it is determined that it is in a normal state when a locus is present within a region surrounded by a boundary B1 and a boundary B2, and in addition, (b) it is determined that it is in a normal state when the locus is present within a region surrounded by a boundary B3 and a boundary B4 and beyond the region surrounded by the boundary B1 and the boundary B2 within a predetermined time t1, and it is determined that it is in a failure state when exceeding the time t1, and (c) it is determined that it is in a failure state when the locus is present beyond the region surrounded by the boundary B3 and the boundary B4.

According to the present example thus, it is not determined that it is in a failure state immediately even when the locus temporarily deviates from the region surrounded by the boundary B1 and the boundary B2 because of influence etc. of noise, and robustness of a failure detection function against noise can be provided.

According to the present example, a failure about signal waveform abnormality in which a signal from the resolver 5 or to the resolver 5 is blocked can be detected.

Also, according to the example of the invention, a failure of a function of notifying the microcomputer of the failure about signal waveform abnormality can be detected.

Also, according to the example of the invention, a failure of the resolver digital conversion function itself which is a process of obtaining $\theta$ based on a signal from the resolver can be detected.

Further, according to the example of the invention, a failure of a function of detecting the failure of the resolver digital conversion function itself and notifying the microcomputer can be detected.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

We claim:

1. A resolver digital converter comprising:

an excitation signal generation pan for generating an excitation signal;

a resolver for receiving the excitation signal generated in the excitation signal generation part and generating resolver signals;

a resolver digital conversion pan for receiving the resolver signals outputted from the resolver, and detecting a failure of the resolver or the resolver digital conversion part; and a microcomputer having an A/D converter for converting the resolver signals outputted from the resolver into a digital value;

wherein, based on the digital value outputted from the A/D converter, the microcomputer approximates a locus in which amplitude of a sine component signal among the resolver signals outputted from the resolver is plotted as the ordinate axis and amplitude of a cosine component signal is plotted as the abscissa axis by a regular n-sided polygon, wherein n is multiples of 4, and detects the failure of the resolver or the resolver digital conversion part such that when said locus matches with sides of the approximated regular n-sided polygon, it is determined that the resolver or the resolver digital conversion part is in a normal state and when the locus does not match, it is determined that the resolver or the resolver digital conversion part is in a failure state.

2. A resolver digital converter comprising:

an excitation signal generation part for generating an excitation signal;

a resolver for receiving the excitation signal generated in the excitation signal generation part and generating resolver signals;

a resolver digital conversion pan for receiving the resolver signals outputted from the resolver, and detecting a failure of the resolver or the resolver digital conversion part; and a microcomputer having an A/D converter for converting the resolver signals outputted from the resolver into a digital value;

wherein, based on the digital value outputted from the A/D converter, the microcomputer approximates a locus in which amplitude of a sine component signal among the resolver signals outputted from the resolver is plotted as the ordinate axis and amplitude of a cosine component signal is plotted as the abscissa axis by a regular n-sided polygon, wherein n is multiples of 4, and detects the failure of the resolver or the resolver digital conversion part such that when said locus is present within a region having a predetermined range about sides of the approximated regular n-sided polygon, it is determined that the resolver or the resolver digital conversion part is in a normal state and when the locus does not match, it is determined that the resolver is in a failure state.

3. A resolver digital converter as claimed in claim 2, wherein when the locus is present within a first region having a first predetermined range about sides of the approximated polygon, it is determined that the resolver is in a normal state and when the locus does not match with the first region having the first predetermined range about the sides of the approximated polygon and the locus is present within a second region having a second predetermined range larger than the first range about the sides of the polygon and time for which the locus deviates from the first region is shorter than a predetermined time, it is determined that the resolver is in a normal state.

4. A resolver digital convener as claimed in claim 3, wherein when the locus does not match with a first region having a first predetermined range about sides of the approximated polygon and the locus is present within a second region having a second predetermined range larger than the first range about the sides of the polygon and time for which the locus deviates from the first region is longer than a predetermined time, it is determined that the resolver is in a failure state and when the locus does not match with the first region having the first predetermined range about the sides of the approximated polygon and the locus deviates from the second region having the second predetermined range larger than the first range about the sides of the polygon, it is determined that the resolver or the resolver digital conversion part is in a failure state.

5. A resolver digital converter as in claim 1, further comprising:

a conversion trigger generation part for receiving the excitation signal outputted from the excitation signal generation part and generating and outputting a conversion trigger signal;

an wherein the A/D converter converts the resolver signals outputted from the resolver into a digital value by the conversion trigger signal outputted from the conversion trigger generation part.

6. A resolver digital converter as in claim 2, further comprising:

a conversion trigger generation part for receiving the excitation signal outputted from the excitation signal generation part and generating and outputting a conversion trigger signal;

wherein the A/D converter converts the resolver signals outputted from the resolver into a the digital value by the conversion trigger signal outputted from the conversion trigger generation part.

* * * * *